Patented Mar. 13, 1928.

1,662,550

UNITED STATES PATENT OFFICE.

CORNELIUS D. VREELAND, OF VINELAND, NEW JERSEY.

SULPHUR FUNGICIDE AND INSECTICIDE.

No Drawing. Application filed November 24, 1925. Serial No. 71,203.

This invention relates to fungicides and insecticides, more particularly to a sulphur compound for fungicidal and insecticidal purposes having improved properties.

Elemental sulphur is one of the most useful substances as an agent in the combating of certain diseases of fruit trees and field crops, both for the killing of fungi and of insects, such as the Texas cotton flea and the red spider. The sulphur, as such, has no destructive effect, but it combines slowly with the oxygen of the air under normal atmospheric conditions, forming sulphur dioxide and various other oxidation products, which act as the fungicide and insecticide. Sulphur and compositions containing the same are applied by two methods, one of which is dusting the same by means of suitable blowing apparatus whereby a current of air carries the fine powder onto the foliage and fruit, where it lodges as a thin film which is acted upon by the air evolving the various oxidation products slowly. The other method consists in making an emulsion or other mixture of the sulphur with water and spraying the same upon the plants to be treated.

The protective action of sulphur dust on certain fruits, such as apples, is considerably less than on peaches, because the apples have a smooth waxy surface which prevents the adherence of the dust thereto to a much greater extent than the peach, which has a fuzzy surface. For this reason apples are generally treated with a sulphur spray, whereas, for the best results, peaches are usually treated with the dust. Under different atmospheric conditions some agriculturists utilize either the spray or the dust, and generally it is necessary for them to have on hand the two types of compounds. It is therefore desirable to obtain a sulphur dust mixture which may be used either dry or wet and thus obviate the necessity of having the two types on hand for possible future use.

Sulphur, when pure, although ground to three hundred or even five hundred mesh, cannot be blown or dusted on foliage without delivering it in lumps and blotches. When freshly ground, sulphur is somewhat mobile, but after standing for a while, as is generally the case in practice, it gathers into lumps and balls of irregular size and distribution so that when dusted it does not give a uniform film on the plants. This agglomeration is probably caused by an electrified condition of the particles which develops upon standing, perhaps being due to the neutralization of positive and negative static charges carried by the various particles of the sulphur. To overcome this tendency it has been proposed to mix the sulphur with say ten per cent of hydrated lime and grind the two together. The material so made is mobile and flows easily from a dusting machine, thus permitting the formation of a comparatively even film on the foliage. However, this mixture can be used only in the dry state, as it is not readily wetted by water.

The application of sulphur in a liquid, such as water, in the form of a spray, is the best way of obtaining adherence to the foliage, but, in order to obtain such a suspension, a substance must be used which will break down the surface tension of the water and permit it to wet the sulphur. For this purpose various colloids, such as glue, soap, gelatine and the like, have been proposed. These substances accomplish the desired result of allowing the sulphur to be wetted, but, because of the physical condition of the sulphur, the mixture cannot be used as a dusting powder. Furthermore, when the colloid is insoluble in water, as aluminum hydrate, the colloid tends to coat the particles of sulphur with a thin film which does not allow the oxygen of the air to combine with the sulphur, thus reducing the efficiency thereof.

It has also been proposed to make a mixture of equal parts of sulphur and bentonite and heat the same to the melting point of sulphur in order to cause a sintering to take place. The mass is cooled and ground to a fine powder and is said to be adapted for use either as a dusting powder or as a spray. However, because of the presence of a very large amount of inert colloid, the amount of sulphur in the material is so low as to materially decrease its fungicidal effect. The large proportion of colloid also practically insures a complete covering of the particles of sulphur, thus very greatly reducing the efficiency of the composition.

My invention is intended and adapted to overcome the difficulties inherent in prior compositions of this character, it being among the objects thereof to provide a fungicide and insecticide containing sulphur which is adapted to be used either in the form of dust or as a spray material.

It is a further object of my invention to provide a material which is cheap, highly effective, containing but a small proportion of inert material and the manufacture of which is a simple and inexpensive procedure.

In practicing my invention I have discovered that if elemental sulphur is intimately mixed with a soluble acetate, even in very small proportions, the tendency of the sulphur to form in balls or lumps is entirely prevented and the sulphur becomes miscible with water. I have found that calcium acetate is an excellent material for this purpose and if pure calcium acetate is used, it accomplishes the first effect perfectly, but it requires a relatively large amount thereof to cause the sulphur to be well wetted by water.

If crude pyroligneous calcium acetate is used, the effect thereof is greatly increased so that but a small amount thereof is sufficient to give the desired wetting result. The reason for the increased efficiency of the crude material I am unable to state, but apparently the pyroligneous compounds which are formed during the destructive distillation of wood and which contaminate the calcium acetate produced from the products of distillation have an accelerating effect which is very desirable. In making my mixtures I generally grind together, in a suitable mill, a major proportion of sulphur, generally ninety per cent or more, with less than ten per cent of the calcium acetate. I have found that excellent results may be obtained by using ninety-three to ninety-seven per cent of sulphur with seven to three per cent of crude pyroligneous acetate.

It will be noted that I have provided a very simple procedure for the manufacture of my material; namely, the grinding together of two ingredients, the purpose of the grinding being not necessarily to subdivide the particles further but to provide the intimate mixture which appears to be necessary for the desired effect. Not only is the procedure simple, but the resulting material is inexpensive, since crude acetate, costing but a few cents per pound, and sulphur, which is equally inexpensive, are used. The process does not involve any chemical reactions and it does not require skilled labor to operate the same. My material may be used equally effectively as a spray or as a dusting powder, thus making it unnecessary for the agriculturist to have on hand the two materials.

What I claim is:

1. A fungicidal and insecticidal material comprising an intimate dry mixture of finely divided elemental sulphur and an acetate.

2. A fungicidal and insecticidal material comprising an intimate mixture of finely divided elemental sulphur and calcium acetate.

3. A fungicidal and insecticidal material comprising an intimate mixture of finely divided elemental sulphur and crude calcium acetate.

4. A fungicidal and insecticidal material comprising an intimate mixture of finely divided elemental sulphur and crude pyroligneous acetate.

5. A fungicidal and insecticidal material comprising an intimate mixture of over 90% finely divided elemental sulphur and less than 10% of crude pyroligneous acetate.

6. A fungicidal and insecticidal material comprising an intimate mixture of 97% to 93% finely divided elemental sulphur and three to seven per cent of crude pyroligneous acetate.

7. A method of making a fungicidal and insecticidal material which comprises grinding together a major proportion of elemental sulphur with sufficient acetate to prevent balling of the sulphur and to cause it to be wetted by water.

8. A method of making a fungicidal and insecticidal material which comprises grinding together a major proportion of elemental sulphur with sufficient crude pyroligneous acetate to prevent balling of the sulphur and to cause it to be wetted by water.

9. A method of making a fungicidal and insecticidal material which comprises grinding together over 90% of elemental sulphur with less than 10% of crude pyroligneous acetate to prevent balling of the sulphur and to cause it to be wetted by water.

In testimony whereof, I have hereunto subscribed my name this nineteenth day of November 1925.

CORNELIUS D. VREELAND.